US008959785B2

(12) United States Patent
Craig et al.

(10) Patent No.: US 8,959,785 B2
(45) Date of Patent: Feb. 24, 2015

(54) APPARATUS AND METHOD FOR MEASURING RUNOUT

(75) Inventors: Terry Allen Craig, South Shore, KY (US); Jimmie Melvin Clark, Wheelersburgh, OH (US)

(73) Assignee: General Electric Company, Schenectady, NY (US)

( * ) Notice: Subject to any disclaimer, the term of this patent is extended or adjusted under 35 U.S.C. 154(b) by 1063 days.

(21) Appl. No.: 12/982,310

(22) Filed: Dec. 30, 2010

(65) Prior Publication Data

US 2012/0173197 A1 Jul. 5, 2012

(51) Int. Cl.
*G01B 7/31* (2006.01)
*G01B 11/02* (2006.01)
*F01D 25/28* (2006.01)

(52) U.S. Cl.
CPC ............. *G01B 11/026* (2013.01); *F01D 25/28* (2013.01); *F05D 2230/644* (2013.01); *F05D 2270/804* (2013.01)
USPC .............................................. 33/543; 33/645

(58) Field of Classification Search
USPC ........... 33/412, 533, 543, 550, 551, 613, 645, 33/710
See application file for complete search history.

(56) References Cited

U.S. PATENT DOCUMENTS

| | | | | |
|---|---|---|---|---|
| 3,695,779 | A | * | 10/1972 | Kastan et al. ................. 416/135 |
| 5,924,699 | A | * | 7/1999 | Airey et al. ................ 416/193 A |
| 6,416,280 | B1 | | 7/2002 | Forrester et al. |
| 6,557,445 | B1 | * | 5/2003 | Ishikawa ........................ 82/158 |
| 7,792,600 | B2 | | 9/2010 | Borneman et al. |
| 2002/0077770 | A1 | | 6/2002 | Kaminski et al. |
| 2006/0112577 | A1 | | 6/2006 | Jones |
| 2008/0152498 | A1 | * | 6/2008 | Mollmann et al. ............. 416/144 |
| 2008/0226462 | A1 | * | 9/2008 | Albert et al. ................. 416/97 R |
| 2009/0100695 | A1 | * | 4/2009 | Muellner ........................ 33/832 |
| 2010/0046008 | A1 | | 2/2010 | Ghulam |
| 2013/0047451 | A1 | * | 2/2013 | Koumoto ..................... 33/501.7 |
| 2014/0093355 | A1 | * | 4/2014 | Hyatt et al. ................... 415/108 |

FOREIGN PATENT DOCUMENTS

| | | |
|---|---|---|
| EP | 0 879 394 B1 | 2/2004 |
| EP | 2375004 A2 | 10/2011 |

OTHER PUBLICATIONS

Microtrak II-SA Stand-alone Laser Heads, High Speed Laser Displacement Sensor, MTI Instruments, Inc.
PCT Search Report and Written Opinion dated Jan. 31, 2012 from corresponding Application No. PCT/US2011/061584.

* cited by examiner

*Primary Examiner* — G. Bradley Bennett
(74) *Attorney, Agent, or Firm* — General Electric Company; Brian P. Overbeck

(57) ABSTRACT

A method and apparatus for measuring runout of using a distance measuring sensor mounted to a rotor and targeted at a circular wall, an electronic inclinometer mounted within a diameter of a hub of the rotor, and a microcontroller in data communication with the inclinometer and the sensor. A computer may be operably connected to the microcontroller and used for programming the microcontroller. A rotatable fixture including a bar mounted to the hub may be used to mount the sensor to a distal end of the bar and the microcontroller and the inclinometer may be mounted on the bar. Runout of a fan shroud circumscribing fan blades of an engine rotor may be measured with the apparatus and method and the bar angularly located between a pair of adjacent blades. The computer may be used to gather data from inclinometer and sensor and calculate runout.

43 Claims, 5 Drawing Sheets

APPARATUS AND METHOD FOR MEASURING RUNOUT

BACKGROUND OF THE INVENTION

1. Field of the Invention

The present invention relates to measuring runout and, more particularly, to measuring runout of aircraft gas turbine engine fan shrouds.

2. Description of Related Art

High by-pass aircraft gas turbine engines include a large fan section with large fan blades that seal radially outwardly against an abradable shroud disposed within a fan casing of the engine. Clearance between aircraft engine fan blade tip and the shroud has a direct impact on engine fuel burn performance and, in some cases, engine integrity. As such, accurate measurement of the fan blade clearance is important.

Part of this measurement requires accurate measurement of the fan shroud runout. Runout is a function of the distance between an engine centerline about which a rotor, including the fan, of the engine rotates and the shroud as a function of angular position around the shroud. There is a great need for a fast, accurate and precise method for measuring fan shroud runout for the full circumference or to automatically track runout angle in conjunction with the runout magnitude. Present methods include fixing an attachment to stationary engine structure to measure runout angle and measurements are done using dial gauges in stages at intervals around the fan shroud requiring fixing and refixing the attachment.

Fan shroud runout measured using a dial indicator and visually approximating the angular location is a tedious operation and the runout is only recorded at a few discreet locations and is manually recorded. This current technique lends itself to many sources of error including positioning error and limiting the number of measurement to only a few locations. This method only provides an approximation of the actual case runout and the maximum runout condition can be missed if the maximum runout value is not at one the measured locations. Better angular positioning can be obtained with a rotary encoder, but these devices require and attachment to the stationary structure and this is not practical due to the size of the tooling involved. This measurement technique used for every production engine is time consuming and is not desirable in a production or overhaul environment. The results generated by the current method are only an approximation of the fan shroud runout due to the limited number of data points gathered. In addition, this current measurement technique for the large engines such as the General Electric GE90 engine requires that one fan blade not be installed in order to install the measurement tooling. This interruption of the assembly flow also adds cycle time and cost to the overall process.

It is highly desirable to improve accuracy and speed of and to automate the measurement, recording, and analysis of fan shroud runout.

SUMMARY OF THE INVENTION

A runout measuring method and apparatus for measuring runout of a circular cross section wall circumscribing a rotor using a distance measuring sensor mounted to the rotor and targeted at the circular cross section wall where a runout measurement is to be made. An electronic inclinometer is mounted within a diameter of a hub of the rotor and a microcontroller is in data communication with the electronic inclinometer and the distance measuring sensor. The runout measurement is made in one revolution of the rotor.

In an exemplary embodiment of the apparatus microcontroller is in two way data communication with the electronic inclinometer and the distance measuring sensor. A computer is in data communication with the microcontroller for programming the microcontroller and/or gathering data from electronic inclinometer and distance measuring sensor. The distance measuring sensor is a laser distance measuring sensor.

In the exemplary embodiment of the apparatus a rotatable fixture including a bar is mounted to the hub, the distance measuring sensor mounted to a first distal end of the bar, and the microcontroller and the electronic inclinometer mounted on the bar.

A more particular embodiment of the runout measuring method and apparatus includes measuring runout of a fan shroud circumscribing an engine rotor disposed within a forward portion of a fan casing in a fan section of a turbofan gas turbine engine. The distance measuring sensor is mounted to a hub of the rotor and targeted at the shroud where a runout measurement is to be made. The fan shroud circumscribes a row of circumferentially spaced apart fan blades extending radially outwardly from a fan rotor disk of the engine rotor and the bar is angularly located between a pair of adjacent ones of the blades. The distance measuring sensor may be mounted on a support arm extending axially aftwardly at a right angle from the bar and the distance measuring sensor is circumferentially disposed between the pair of the fan blades.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
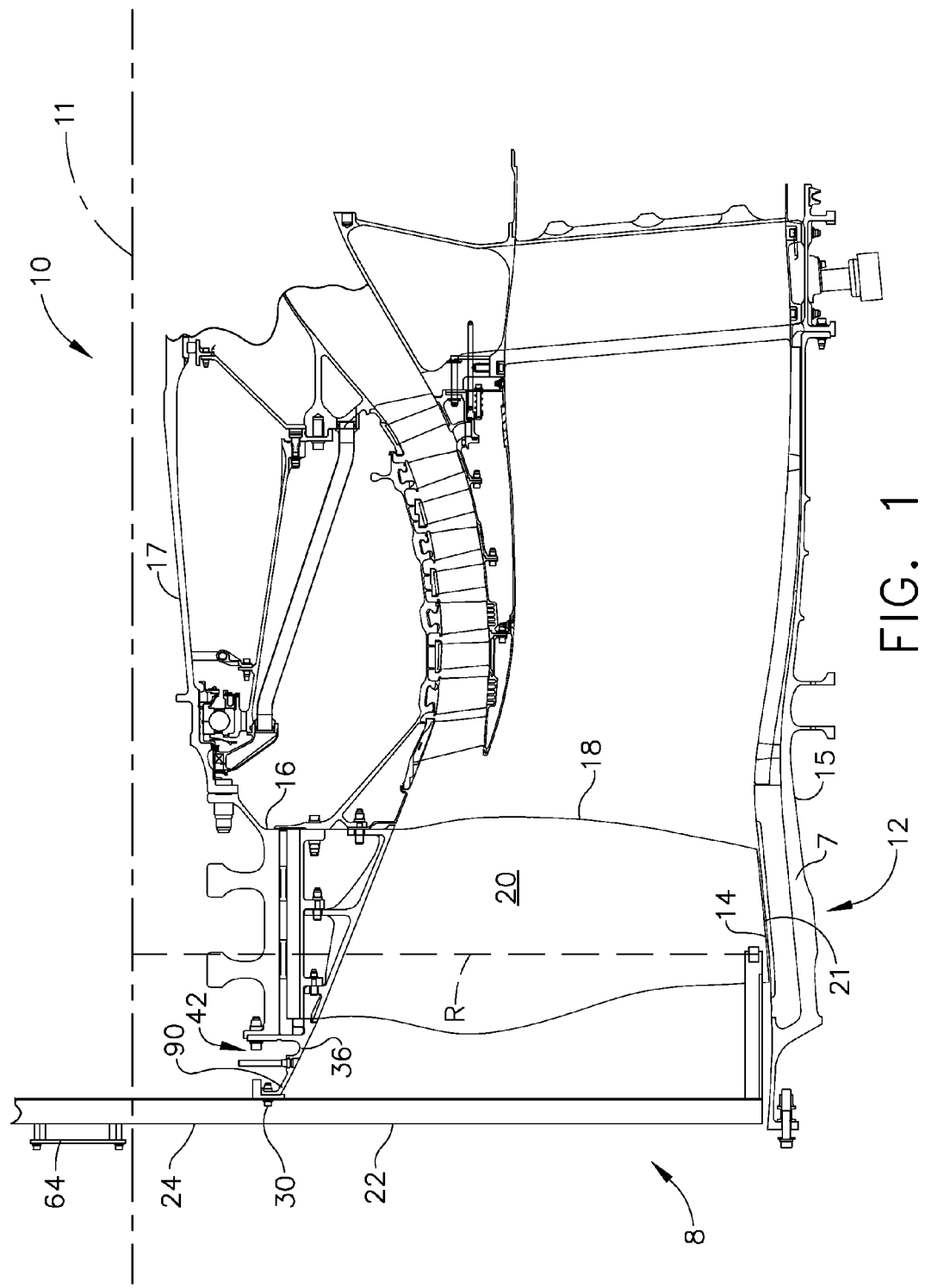
FIG. 1 is a cross-sectional view illustration of a fan inlet of a gas turbine engine having mounted therein an apparatus for measuring shroud runout on a fan shroud of the engine.
Figure 2:
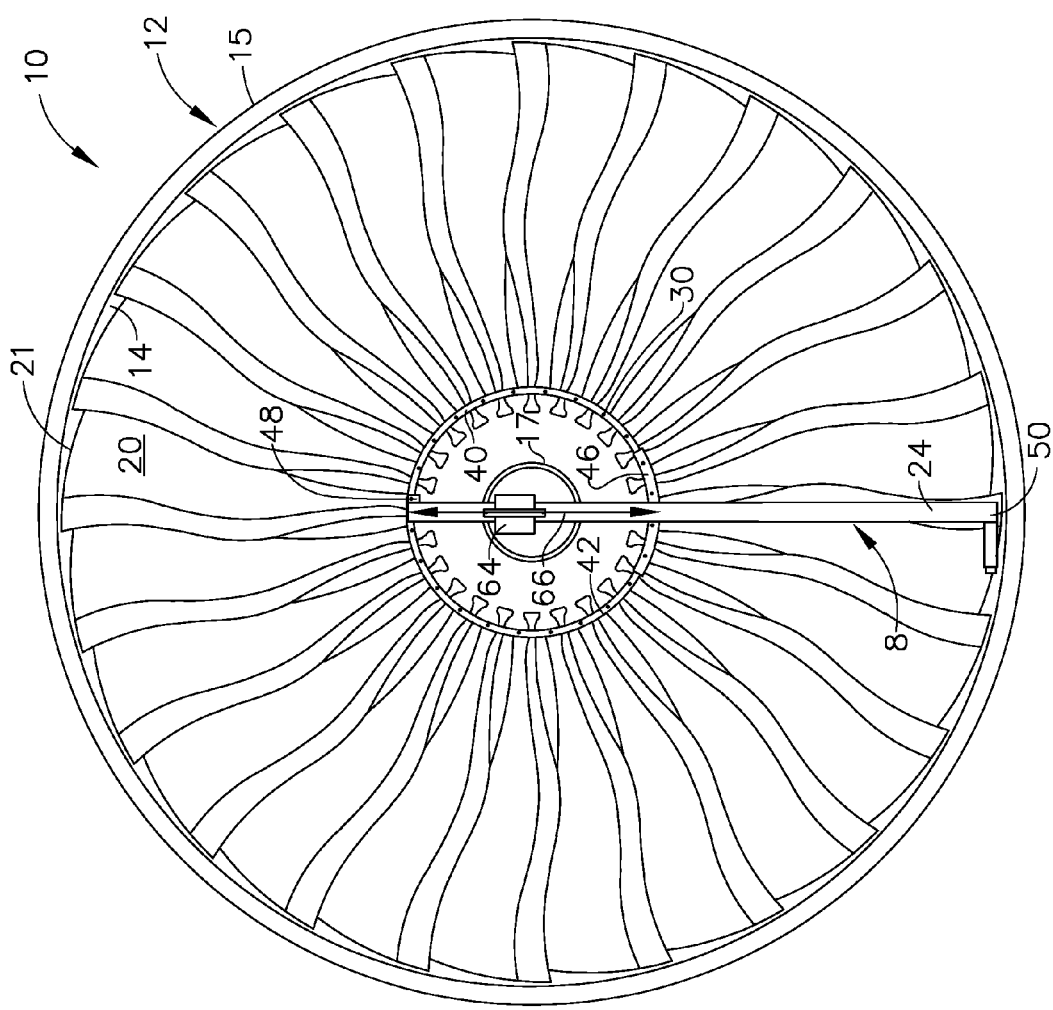
FIG. 2 is a forward looking aft axial view illustration of the apparatus taken through 2-2 in FIG. 1.
Figure 3:
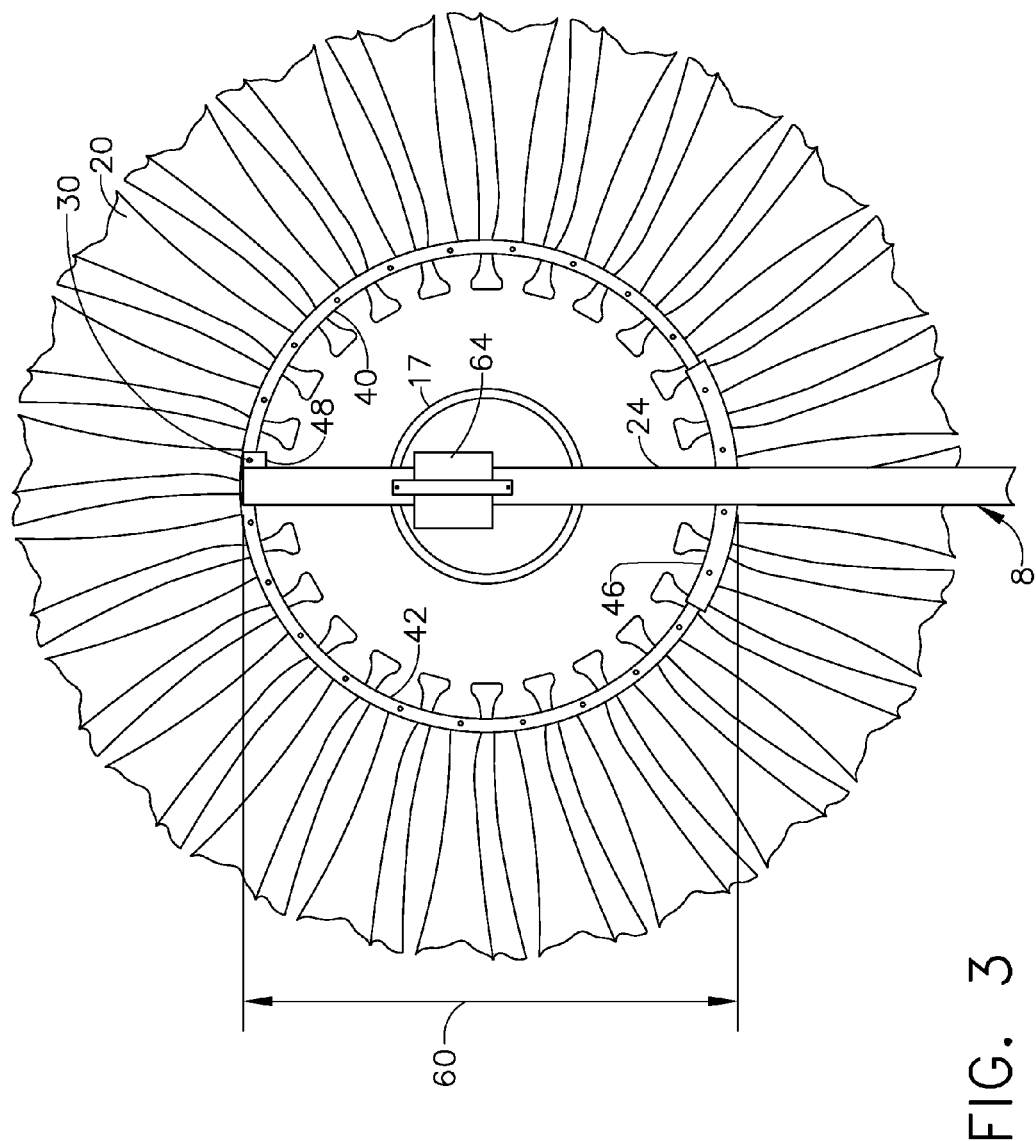
FIG. 3 is an enlarged view illustration of an electronics box containing an inclinometer of the apparatus illustrated in FIG. 2.

Illustrated in FIGS. 1-3 is an exemplary embodiment of a fan shroud runout measuring apparatus 8 for measuring runout R of a fan shroud 14 disposed within a forward portion 7 of a fan casing 15 in a fan section 12 of an exemplary turbofan gas turbine engine 10 circumscribed about an engine centerline 11. The engine 10 includes a fan assembly 12 with a fan rotor disk 16 of an engine rotor 17. A single axially located row 18 of circumferentially spaced apart fan blades 20 extend radially outwardly from the fan rotor disk 16 and includes a BLISK. BLISKS have blades that are integral with a disk. The fan shroud 14 surrounds the fan blades 20 and is designed to maintain a small clearance between fan blade tips 21 of the blades 20 and the shroud 14. A forward flange 40 of a conical extension 36 connected to the disk 16 is used to mount a conical spinner not illustrated herein. The conical extension 36 is a part of a hub 42 of the engine rotor 17.

The fan shroud runout measuring apparatus 8 includes a rotatable fixture 24 mounted to the forward flange 40 by bolts 30. The fixture 24 includes a bar 44 with an arcuate first mounting flange 46 spaced apart from a tab second mounting flange 48. The first and second mounting flanges 46, 48 are bolted to the forward flange 40 and the hub 42 of the engine 10 by the bolts 30. The bar 44 extends radially outwardly from the second mounting flange 48 to a first distal end 50 of the bar 44 proximate the fan shroud 14.

Figure 4:
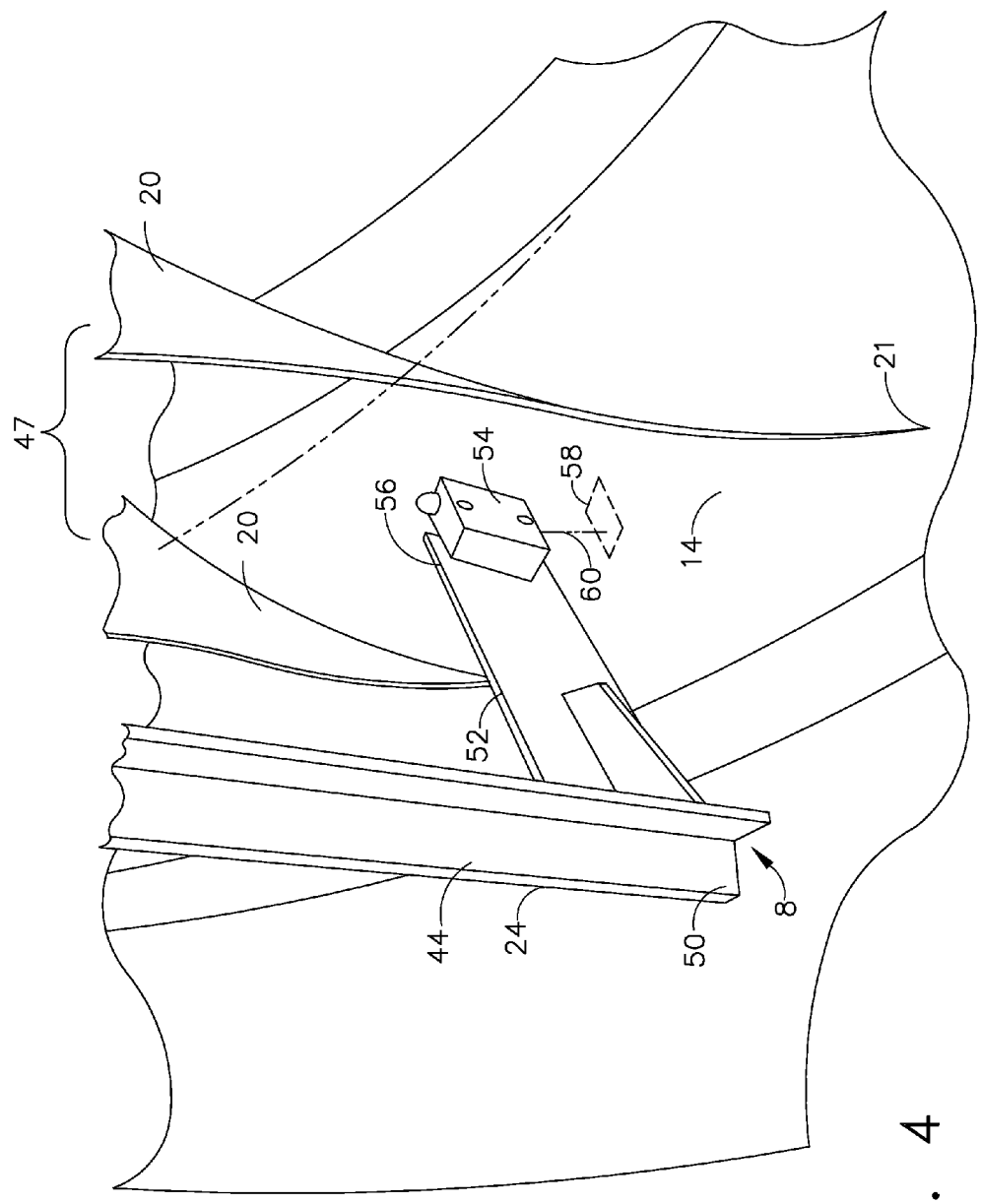
FIG. 4 is a axial perspective view illustration of a distance measuring device incorporating laser of the apparatus illustrated in FIG. 2.

Referring to FIG. 4, a support arm 52 extends axially aftwardly at a right angle from the bar 44 at the first distal end 50 of the bar 44. An optical or other electronic distance measuring sensor 54 mounted on the arm 52 is targeted at an area 58 where the runout measurement is to be made. The electronic distance measuring device 54 illustrated herein is a laser distance measuring sensor 54 mounted at second distal end 56 of the arm 52. The laser distance measuring device 54 illustrated herein is a LTC-050-20-SA from MTI Instruments. A laser beam 60 is visible and may be aimed and it has an optimal zone in which an LED 60 of the laser distance measuring device 54 turns green which for the method disclosed herein is a point at which the telemetry of the laser is 0 mm.

The bar 44 is angularly located between a pair 47 of adjacent ones of the fan blades 20. The support arm 52 extends axially so that the distance measuring sensor 54 is circumferentially disposed between the pair 47 of adjacent ones of the fan blades 20. This allows the rotatable fixture 24 to be mounted to the hub 42 of the engine rotor 17 without having to remove any of the fan blades 20.

Referring to FIGS. 1-4, a telemetry electronics box 64 is mounted to the fixture 24 and more particularly to the bar 44 at a radial location within a diameter 66 of the hub 42 of the engine 10. Mounted within the box 64 is an electronic inclinometer 70 illustrated in FIG. 5. The inclinometer 70 illustrated herein includes two perpendicular accelerometers that are sensitive to gravity. After the inclinometer senses gravitational force on the accelerometers it calculates, the incline of the chip 72 containing the inclinometer and returns a digitized angle signal indicating an angular position of the fan rotor disk 16 and the bar 44 of the rotatable fixture 24. The electronic inclinometer 70 provides a more accurate and complete data set than is currently achievable with no need to attach any apparatus to stationary engine structure surrounding the fan.

Figure 5:
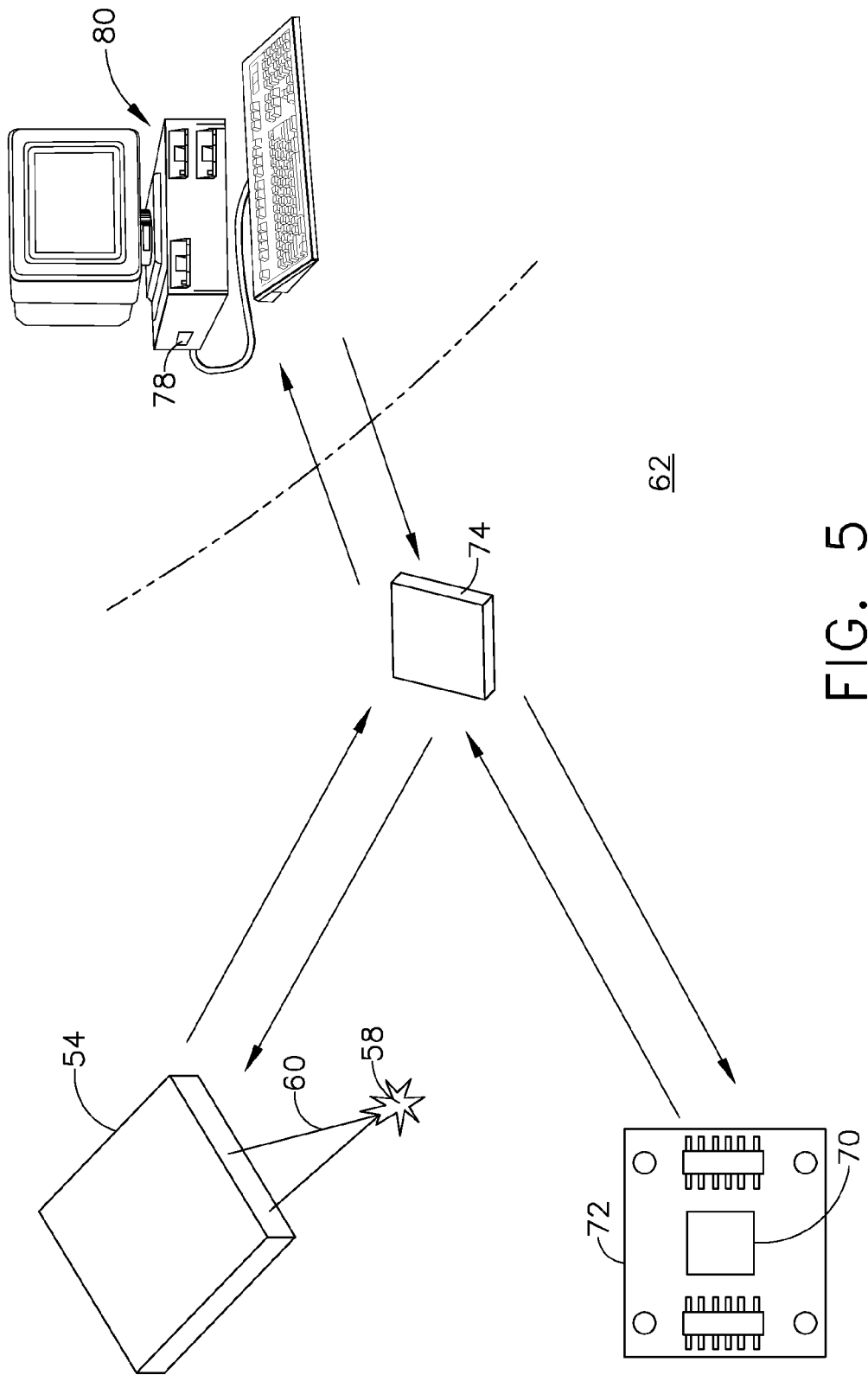
FIG. 5 is a diagrammatical illustration of a computerized runout data acquisition system including the inclinometer and the distance measuring device of the apparatus illustrated in FIG. 2.

A computerized runout data acquisition system 62 generally illustrated in FIG. 5 includes a microcontroller 74 mounted within the telemetry electronics box 64. An exemplary microcontroller 74 is an ATMega640 from ATMEL which is an 8-bit RISC processor with 64 Kb of flash for firmware. The software may be written in VB.NET, a state of the art programming language. The microcontroller 74 interfaces through a serial (RS232) port 78 on a personal computer 80 (or any other computer) to communicate with the computer 80 for both programming and measuring runout. Runout data is collected, analyzed, graphed, calculated real-time on the computer 80. The runout data then can be exported anyway the operators of the data acquisition system 62 desire.

Data is transmitted both to and from the laser distance measuring sensor 54 and the microcontroller 74 over the same wire using RS-485 to communicate. This includes half-duplex which splits the speed of data transmission between the laser distance measuring sensor 54 and the microcontroller 74 in half.

An exemplary method of measuring runout using the fan shroud runout measuring apparatus 8 for measuring runout of a fan shroud 14 disposed within a forward portion 7 of a fan casing 15 includes rotating the fan hub 42 of the engine 10 once. The runout data measured by the laser distance measuring sensor 54 and the corresponding angular position of the fan rotor disk 16 and the rotatable fixture 24 measured by the electronic inclinometer 70 are transmitted to the microcontroller 74 of the computerized runout data acquisition system 62. The computer, using the software, averages 360 degrees of measurements to calculate runout in a single manual rotation of the fan rotor disk 16.

During measuring the computer 80 by way of the microcontroller 74 instructs the electronic inclinometer 70 and the laser distance measuring sensor 54 to start getting data generally using the following steps.

Step 1: The microcontroller 74 requests data from the electronic inclinometer 70.

Step 2: The electronic inclinometer 70 transmits data to the microcontroller 74.

Step 3: The microcontroller 74 requests data from the laser distance measuring sensor 54.

Step 4: The laser distance measuring sensor 54 transmits data to the microcontroller 74.

Step 5: The microcontroller 74 collects all data and sends it to the computer 80.

This series of steps is repeated 150+ times a second.

The apparatus and method described above may be used to measure runout of a casing or circular cross section wall such as the fan shroud 14 or the fan casing 15 circumscribing a rotor such as the engine rotor 17 illustrated herein.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims.

What is claimed is:

1. A runout measuring apparatus for measuring runout of a circular cross section wall circumscribing a rotor, the apparatus comprising:
   a distance measuring sensor mounted to the rotor and targeted at the circular cross section wall where a runout measurement is to be made,
   an electronic inclinometer mounted within a diameter of a hub of the rotor, and
   a microcontroller in data communication with the electronic inclinometer and the distance measuring sensor.

2. An apparatus as claimed in claim 1 further comprising the microcontroller in two way data communication with the electronic inclinometer and the distance measuring sensor.

3. An apparatus as claimed in claim 2 further comprising a computer in data communication with the microcontroller.

4. An apparatus as claimed in claim 3 further comprising the computer operably connected to the microcontroller for programming the microcontroller.

5. An apparatus as claimed in claim 4 wherein the distance measuring sensor is a laser distance measuring sensor.

6. An apparatus as claimed in claim 4 wherein the electronic inclinometer includes two perpendicular accelerometers that are sensitive to gravity.

7. An apparatus as claimed in claim 1 further comprising the microcontroller in two way data communication with the electronic inclinometer and the distance measuring sensor.

8. An apparatus as claimed in claim 1 further comprising:
a rotatable fixture including a bar mounted to the hub,
the distance measuring sensor mounted to a first distal end of the bar, and
the microcontroller and the electronic inclinometer mounted on the bar.

9. An apparatus as claimed in claim 8 further comprising a computer in data communication with the microcontroller and the computer operably connected to the microcontroller for programming the microcontroller.

10. An apparatus as claimed in claim 4 wherein the distance measuring sensor is a laser distance measuring sensor and the electronic inclinometer includes two perpendicular accelerometers that are sensitive to gravity.

11. A runout measuring apparatus for measuring runout of a fan shroud circumscribing an engine rotor disposed within a forward portion of a fan casing in a fan section of a turbofan gas turbine engine, the apparatus comprising:
a distance measuring sensor mounted to a hub of the rotor and targeted at the shroud where a runout measurement is to be made,
an electronic inclinometer mounted within a diameter of the hub, and
a microcontroller in data communication with the electronic inclinometer and the distance measuring sensor.

12. An apparatus as claimed in claim 11 further comprising the microcontroller in two way data communication with the electronic inclinometer and the distance measuring sensor.

13. An apparatus as claimed in claim 12 further comprising a computer in data communication with the microcontroller and the computer operably connected to the microcontroller for programming the microcontroller.

14. An apparatus as claimed in claim 13 wherein the distance measuring sensor is a laser distance measuring sensor.

15. An apparatus as claimed in claim 11 further comprising:
a rotatable fixture including a bar mounted to the hub,
the distance measuring sensor mounted to a first distal end of the bar, and
the microcontroller and the electronic inclinometer mounted on the bar.

16. An apparatus as claimed in claim 15 further comprising a computer in data communication with the microcontroller and the computer operably connected to the microcontroller for programming the microcontroller.

17. An apparatus as claimed in claim 16 wherein the distance measuring sensor is a laser distance measuring sensor and the electronic inclinometer includes two perpendicular accelerometers that are sensitive to gravity.

18. An apparatus as claimed in claim 15 further comprising:
a row of circumferentially spaced apart fan blades extending radially outwardly from a fan rotor disk of the engine rotor,
the fan shroud circumscribing the fan blades, and
the bar angularly located between a pair of adjacent ones of the blades.

19. An apparatus as claimed in claim 18 further comprising the distance measuring sensor mounted on a support arm extending axially aftwardly at a right angle from the bar and the distance measuring sensor circumferentially disposed between the pair of the fan blades.

20. An apparatus as claimed in claim 19 further comprising a computer in data communication with the microcontroller and the computer operably connected to the microcontroller for programming the microcontroller.

21. An apparatus as claimed in claim 20 wherein the distance measuring sensor is a laser distance measuring sensor and the electronic inclinometer includes two perpendicular accelerometers that are sensitive to gravity.

22. A method for measuring runout of a circular cross section wall circumscribing a rotor, the method comprising:
mounting a distance measuring sensor to the rotor and targeting it at the circular cross section wall where a runout measurement is to be made,
mounting an electronic inclinometer within a diameter of a hub of the rotor,
placing a microcontroller in data communication with the electronic inclinometer and the distance measuring sensor,
rotating the rotor,
measuring a distance between the electronic distance measuring sensor and the wall with the electronic distance measuring sensor, and
measuring angular position of the rotor with the electronic inclinometer during the rotating.

23. A method as claimed in claim 22 further comprising placing the microcontroller in two way data communication with the electronic inclinometer and the distance measuring sensor.

24. A method as claimed in claim 23 further comprising placing a computer in data communication with the microcontroller and gathering data in the computer from the electronic inclinometer and the distance measuring sensor.

25. A method as claimed in claim 24 further comprising calculating runout around the circular cross section wall in the computer using data gathered by the computer from the electronic inclinometer and the distance measuring sensor.

26. A method as claimed in claim 25 further comprising programming the microcontroller using the computer.

27. A method as claimed in claim 26 further comprising performing the measuring a distance between the electronic distance measuring sensor using a laser distance measuring sensor.

28. A method as claimed in claim 22 further comprising the mounting of the distance measuring sensor and the electronic inclinometer to the rotor includes mounting the distance measuring sensor and the electronic inclinometer on a bar of a rotatable fixture and mounting the rotatable fixture on the hub.

29. A method for measuring runout of a fan shroud circumscribing an engine rotor disposed within a forward portion of a fan casing in a fan section of a turbofan gas turbine engine, the method comprising:
mounting a distance measuring sensor to the rotor and targeting it at the shroud where a runout measurement is to be made,
mounting an electronic inclinometer within a diameter of a hub of the rotor,
placing a microcontroller in data communication with the electronic inclinometer and the distance measuring sensor,
rotating the rotor,
measuring a distance between the electronic distance measuring sensor and the shroud with the electronic distance measuring sensor, and
measuring angular position of the rotor with the electronic inclinometer during the rotating.

30. A method as claimed in claim 29 further comprising:
placing the microcontroller in two way data communication with the electronic inclinometer and the distance measuring sensor, placing a computer in data communication with the microcontroller, and gathering data in the computer from the electronic inclinometer and the distance measuring sensor.

31. A method as claimed in claim 30 further comprising calculating runout around the fan shroud in the computer using data gathered by the computer from the electronic inclinometer and the distance measuring sensor.

32. A method as claimed in claim 31 further comprising programming the microcontroller using the computer.

33. A method as claimed in claim 32 further comprising performing the measuring a distance between the electronic distance measuring sensor using a laser distance measuring sensor.

34. A method as claimed in claim 29 further comprising the mounting of the distance measuring sensor and the electronic inclinometer to the rotor includes mounting the distance measuring sensor and the electronic inclinometer on a bar of a rotatable fixture and mounting the rotatable fixture on the hub.

35. A method as claimed in claim 34 further comprising:
placing the microcontroller in two way data communication with the electronic inclinometer and the distance measuring sensor, placing a computer in data communication with the microcontroller, and gathering data in the computer from the electronic inclinometer and the distance measuring sensor.

36. A method as claimed in claim 35 further comprising calculating runout around the fan shroud in the computer using data gathered by the computer from the electronic inclinometer and the distance measuring sensor.

37. A method as claimed in claim 36 further comprising programming the microcontroller using the computer.

38. A method as claimed in claim 37 further comprising performing the measuring a distance between the electronic distance measuring sensor using a laser distance measuring sensor.

39. A method as claimed in claim 34 further comprising the mounting of the rotatable fixture and the mounting the rotatable fixture on the hub includes angularly locating the bar between a pair of adjacent ones of the blades in a row of circumferentially spaced apart fan blades extending radially outwardly from a fan rotor disk of the engine rotor wherein the fan shroud circumscribes the fan blades.

40. A method as claimed in claim 39 further comprising:
placing the microcontroller in two way data communication with the electronic inclinometer and the distance measuring sensor, placing a computer in data communication with the microcontroller, and gathering data in the computer from the electronic inclinometer and the distance measuring sensor.

41. A method as claimed in claim 40 further comprising calculating runout around the fan shroud in the computer using data gathered by the computer from the electronic inclinometer and the distance measuring sensor.

42. A method as claimed in claim 41 further comprising programming the microcontroller using the computer.

43. A method as claimed in claim 42 further comprising performing the measuring a distance between the electronic distance measuring sensor using a laser distance measuring sensor.

* * * * *